UNITED STATES PATENT OFFICE.

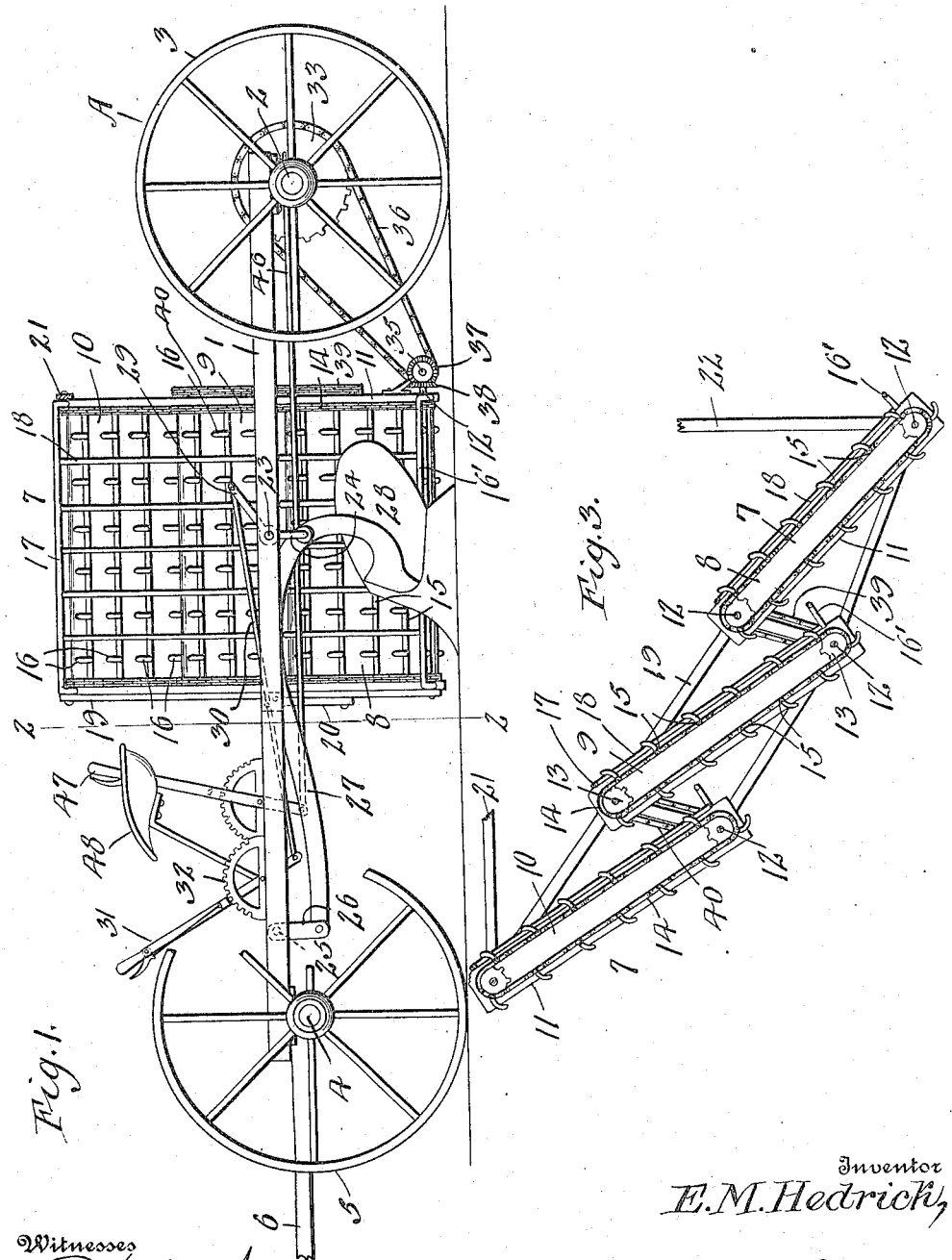

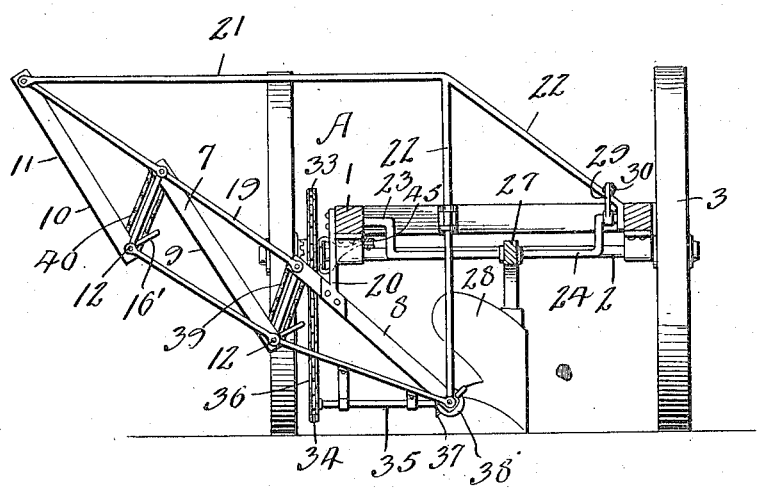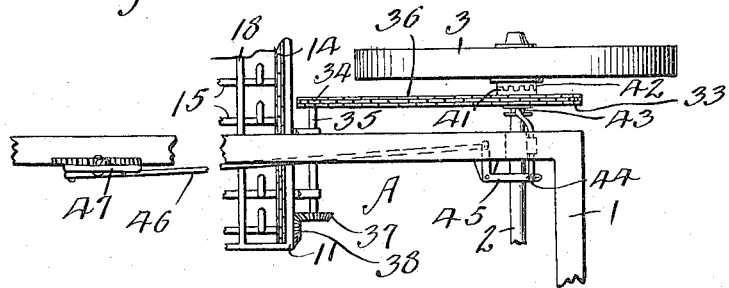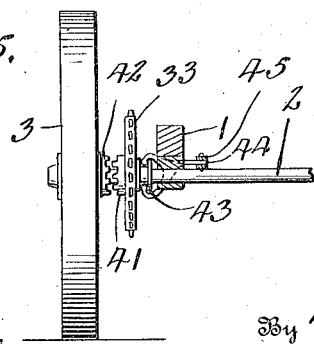

EDWARD McKEE HEDRICK, OF BOX ELDER, MONTANA.

STONE-GATHERING MACHINE.

1,180,148.  Specification of Letters Patent.  Patented Apr. 18, 1916.

Application filed November 21, 1914. Serial No. 873,333.

*To all whom it may concern:*

Be it known that I, EDWARD M. HEDRICK, a citizen of the United States of America, residing at Box Elder, in the county of Hill and State of Montana, have invented new and useful Improvements in Stone-Gathering Machines, of which the following is a specification.

This invention relates to improvements in stone gathering machines and has particular application to a machine for gathering stones from plowed fields.

In carrying out the present invention, it is my purpose to provide a machine of the class described whereby stones may be removed from fields that have been plowed and the dirt taken up with the stones broken up and returned to the ground.

It is also my purpose to improve and simplify the general construction of machines of the class described and to provide a stone gathering machine which may be drawn over the plowed land and wherein the plow and separator will be under the complete control of the driver of the machine so that the plow may be elevated and the separator rendered inactive when desired.

With the above and other objects in view, the invention consists in the construction, combination and arrangement of parts hereinafter set forth in and falling within the scope of the claim.

In the accompanying drawings; Figure 1 is a view in side elevation of a stone gathering machine constructed in accordance with the present invention. Fig. 2 is a vertical sectional view on the line 2—2 of Fig. 1. Fig. 3 is a longitudinal sectional view through the separator. Fig. 4 is a fragmentary top plan view of the machine showing the driving mechanism for the separator. Fig. 5 is a fragmentary rear elevation of the machine, parts being shown in section.

Referring now to the drawings in detail, A designates a wheeled vehicle comprising a substantially rectangular frame 1 disposed in a horizontal plane, a rear axle 2 suitably fastened to the under surface of the frame 1 adjacent to the rear end thereof and carrying the ground wheels 3, and a front axle 4 suitably connected to the under surface of the frame 1 adjacent to the forward end thereof and provided with the ground wheels 5. In the present instance, the front axle 4 is connected with a tongue 6 whereby draft animals may be connected to the vehicle to draw the latter, and the front axle is capable of swinging movement so that the vehicle may be steered.

7 designates a separator comprising a series of endless conveyers 8, 9 and 10. In the present instance, each conveyer comprises side bars 11 spaced apart in parallelism and horizontal shafts 12 journaled in alining bearings carried by the ends of the side bars. Fast upon each shaft 12 adacent to the inner faces of the respective side bars are sprocket wheels 13 and over the sprocket wheels on the respective shafts adjacent to the inner face of each bar is trained an endless chain 14, while spanning the space between the chains and having the opposite ends secured to the chains are transverse slats 15 spaced apart equidistant and adapted to travel around the sprocket wheels in the movement of the chains under the action of the shafts 12. Secured to each slat 15 and projecting upwardly therefrom are fingers 16 spaced apart equal distances longitudinally of the slat. Spanning the space between the side bars 11 of each conveyer and secured to the upper edges of said bars at one end of the conveyer is a cross bar 16' and connected to the upper edges of the side bars of the conveyer at the remaining end of the latter is a cross bar 17. Connected to the cross bars 16' and 17 and extending lengthwise of the conveyer are longitudinal bars 18 spaced apart equal distances parallel with one another and lying in planes respectively between the alining teeth on the slats 15, as clearly illustrated in Fig. 1 of the drawings. These conveyers 8, 9 and 10 are carried by a suitable form of supporting frame 19 and are inclined upwardly and the upper end of the conveyer 8 overlies the lower end of the conveyer 9, while the top end of the last-mentioned conveyer overlies the bottom end of the conveyer 10 and the overlapping ends of the various conveyers are spaced apart so that any loose material thrown onto one conveyer from another may drop from the bottom end of the receiving conveyer. The separator as thus constructed is supported from one of the longitudinal side bars of the frame 1 of the vehicle, and, in the present instance, the side bar of the vehicle is provided with depending hangers 20 spaced apart longitudinally of the bar and secured to the side bars of the supporting frame 19 adjacent to the lower end of the separator, while the upper end of the separator is connected with the outer extremities of horizontal brace bars 21 suitably fastened to the vehicle frame 1 by means of brace bars 22.

The lower end of the separator 7 is disposed a short distance above the ground and on a line coinciding with the longitudinal center line of the vehicle. Journaled in horizontally alining bearings carried by the side bars of the frame 1 is a rock shaft 23 formed with a crank portion 24 between the side bars of the frame and secured to the side bars of the vehicle frame in advance of the rock shaft 23 is a supporting rod 25 while depending from the supporting rod 25 is a link 26 and pivotally connected with the link 26 is the forward end of a plow beam 27 projecting toward the rear end of the vehicle frame and formed with a transverse opening through which the crank portion 24 of the rock shaft 23 is passed. Adjacent to the connection between the crank portion of the rock shaft and the plow beam, the latter is curved downwardly as usual and secured to the lower extremity thereof is a plow 28 disposed immediately adjacent to the lower end of the separator 7 at a point approximately centrally of the width of such separator.

In the present instance, an arm 29 is connected to the rock shaft 23 adjacent to one extremity thereof and pivoted to the outer end of the arm 29 is a rod 30 extending toward the forward end of the vehicle and connected with the lower extremity of an adjusting lever 31 movable about a toothed segment 32 and provided with a locking dog adapted to engage the teeth of the segment to hold the lever in the desired adjusted position. When the lever 31 is swung in one direction the rod 30 and arm 29 rock the shaft 23 to elevate the plow 28 so that the latter will be out of engagement with the ground, while when the lever 31 is moved in the opposite direction motion is transmitted through the rod 30 and arm 29 to rock the shaft in the reverse direction, thereby lowering the plow 28 so that the latter will enter the ground. In this swinging movement of the plow 28 under the action of the lever 31, the plow beam 27 swings about its pivotal connection with the link 26, thereby permitting the easy swinging of the plow.

In the embodiment of my invention selected for illustrative purposes, the driving mechanism for the individual conveyers of the separator 7 comprises a sprocket wheel 33 loosely surrounding the rear axle of the vehicle, a sprocket wheel 34 keyed upon one one end of a jack shaft 35 journaled in horizontally alining bearings suitably secured to the vehicle frame and arranged transversely of such frame and over these sprocket wheels is trained an endless chain 36 whereby motion may be imparted from the sprocket wheel 33 to the sprocket wheel 34. The remaining end of the shaft 35 terminates adjacent to one end of the bottom shaft 12 of the lower conveyer 8 and fixed on such end of the shaft 35 is a bevel pinion 37 meshing with a similar pinion 38 on the adjacent end of the shaft 12. Fixed upon one end of the remaining shaft 12 of the conveyer 8 is a sprocket wheel, while fixed upon the adjacent end of the lower shaft 12 of the conveyer 9 is a second sprocket wheel and over these sprocket wheels is trained an endless chain 39. Similarly, a sprocket wheel is fixed to one end of the shaft 12 at the upper extremity of the conveyer 9 and a like wheel is fast to the adjacent end of the bottom shaft 12 of the conveyer 10 and over these sprocket wheels is trained an endless chain 40. The sprocket wheel 33 is splined upon the rear axle of the vehicle and capable of sliding movement thereon and has the outer end of the hub thereof formed with teeth 41 adapted to interlock with teeth 42 formed on the adjacent end of the wheel hub. The remaining end of the hub of the sprocket wheel 33 is formed with an annular groove 43 in which are engaged the limbs of the bifurcated end of a link 44 slidably mounted within a suitable bearing carried by the adjacent side bar of the vehicle frame and pivotally connected with the remaining end of the link 44 is one extremity of a bell crank lever 45 pivoted upon a suitable support carried by the vehicle frame. From the remaining limb of the bell crank lever 45 leads a rod 46 extending toward the forward end of the vehicle frame and connected with the lower extremity of an operating lever 47.

48 designates the driver's seat on the vehicle.

When the plow 28 is lowered as previously described, the lever 47 is operated to slide the sprocket wheel 33 and place the latter in driving engagement with the adjacent ground wheel of the vehicle so that motion will be transmitted to the conveyers of the separator 7. As the machine is drawn over the plowed ground, the plow 28 throws dirt and rocks or stones onto the lower conveyer 8 and the fingers 16 carry the stones and dirt upwardly and discharge the same onto the conveyer 9. As the material is discharged onto the conveyer 9 a portion of the dirt is loosened from the stones and drops from the lower end of the conveyer 9, while the stones and the remaining dirt thereon are carried upwardly by the fingers and slats of the conveyer 9 and thrown onto the conveyer 10 and as the material is discharged onto the conveyer 10 the loose dirt is dropped from the lower end of the conveyer 10, while the stones are carried upwardly by the conveyer 10 and deposited in a wagon or other receptacle traveling along with the vehicle and in communication with the upper end of the separator.

From the foregoing description taken in connection with the accompanying drawings, the construction, mode of operation and manner of employing my invention will be readily apparent.

It will be seen that I have provided a stone gathering machine wherein the stones may be removed from plowed lands and the dirt taken up with the stones redeposited on the land, while the separator may be rendered operative and inoperative at the will of the operator, and the plow elevated and lowered whenever desired.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

In a stone gathering machine, a wheeled vehicle, a separator comprising a series of endless conveyers arranged in stepped relation at a marked degree of inclination at one side of the vehicle and having one end terminating beneath the longitudinal center thereof, a frame for supporting said carrier, spaced hangers depending from one of the sides of the vehicle and connected with said frame at points in its length, a horizontally disposed bar having one end connected with the upper extremity of said frame, said bar having a downwardly inclined portion terminally connected with the opposite side of the vehicle, a vertically disposed brace depending from said rod at the bend therein and associated with the lower extremity of said frame, a plow arranged to discharge earth upon the separator, and means for operating the plow and separator.

In testimony whereof I affix my signature in presence of two witnesses.

EDWARD McKEE HEDRICK.

Witnesses:
RICHARD L. IGEL,
J. M. FREE.

Copies of this patent may be obtained for five cents each, by addressing the "Commissioner of Patents, Washington, D. C."